United States Patent
Ikezawa et al.

(10) Patent No.: US 7,610,343 B2
(45) Date of Patent: Oct. 27, 2009

(54) PRESENCE DATA MANAGEMENT METHOD

(75) Inventors: Mitsuru Ikezawa, Sagamihara (JP);
Norihiko Kawakami, Kawasaki (JP);
Eri Kawai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1261 days.

(21) Appl. No.: 10/802,776

(22) Filed: Mar. 18, 2004

(65) Prior Publication Data
US 2005/0154698 A1    Jul. 14, 2005

(30) Foreign Application Priority Data
Jan. 9, 2004    (JP)    .............................. 2004-003599

(51) Int. Cl.
*G06F 15/16*    (2006.01)
*G06F 15/173*    (2006.01)
(52) U.S. Cl. ...................................... 709/206; 709/238
(58) Field of Classification Search ................. 709/238, 709/228, 206
See application file for complete search history.

(56) References Cited

U.S. PATENT DOCUMENTS

| | | | |
|---|---|---|---|
| 6,389,127 | B1 | 5/2002 | Vardi et al. |
| 2003/0083046 | A1* | 5/2003 | Mathis ........................ 455/412 |
| 2005/0135240 | A1* | 6/2005 | Ozugur ........................ 370/229 |
| 2006/0090006 | A1* | 4/2006 | Wu ............................. 709/238 |
| 2006/0190591 | A1* | 8/2006 | Bobde et al. ................. 709/224 |
| 2006/0242239 | A1* | 10/2006 | Morishima et al. ........... 709/204 |
| 2009/0009343 | A1* | 1/2009 | Boyer et al. .............. 340/573.1 |

FOREIGN PATENT DOCUMENTS

| | | |
|---|---|---|
| JP | 2001-024692 | 1/2001 |
| JP | 2002-007296 | 1/2002 |
| JP | 2003-296525 | 10/2003 |
| JP | 2004-240821 | 8/2004 |

* cited by examiner

*Primary Examiner*—Larry D Donaghue
(74) *Attorney, Agent, or Firm*—Antonelli, Terry, Stout & Kraus, LLP.

(57) ABSTRACT

The amount of data of presence information delivered from a presence server to a terminal is reduced by letting the presence server discard part of the presence information depending on communication measures and data type available to the terminal, by which the amount of data processed by the terminal is reduced. The presence server fetches terminal information stored therein based on terminal information contained in a presence inquiry request message from a user and thereby learns the type of data that can be processed by the terminal of the user. The presence server reconstructs the presence information of a referred user into information that can be processed by the terminal, and sends the information to the application of the terminal. By reducing the amount of presence data transmitted from the presence server to the terminal, the amount of data to be processed by the terminal can be cut down.

5 Claims, 9 Drawing Sheets

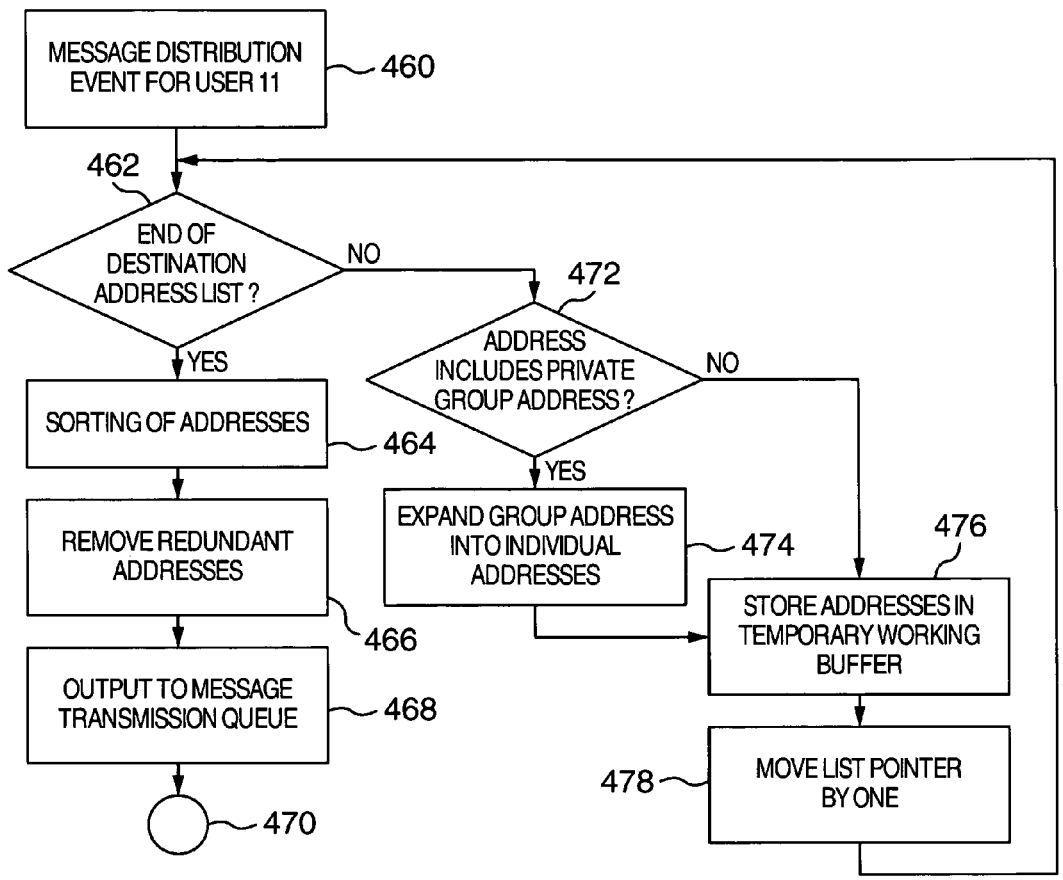

PRESENCE DATA MANAGEMENT METHOD

INCORPORATION BY REFERENCE

This application claims priority based on a Japanese patent application, No. 2004-003599 filed on Jan. 9, 2004, the entire contents of which are incorporated herein by reference.

BACKGROUND OF THE INVENTION

The present invention relates to a data management method for a presence server which has centralized management for the presence information of network users.

With the prevalence of IP networks, personal computers and information communication terminals in recent years, network systems supporting direct communication between individuals are being introduced increasingly. Especially, systems storing information on ever-changing status of individuals and devices as presence information and providing the stored presence information to a terminal accessing the system have recently been in practical use. For example, U.S. Pat. No. 6,389,127 discloses a mechanism for storing information on the statuses of telephone lines and providing information on usage status (busy condition) of a telephone line in response to an inquiry. The patent document explains the advantages of the mechanism in that a call center, etc. can avoid making calls to busy lines and can give customers (currently on the lines) calls after they finished the telephone conversation.

Meanwhile, in some instant message systems that communicate instant messages via a server computer, statuses of users of terminals are registered with the instant message server under certain prescribed conditions. The prescribed conditions include the start/finish of an instant message application installed in the terminal, the user's selection from a menu of the instant message application, etc. It is possible for each user to register with the server so as to permit the server to disclose his/her status information (registered with the server) to other users of the instant message system. Users allowed to receive the status information (hereinafter referred to as "watchers") can watch the status information (stored in the server) of the user who permitted the information disclosure by use of the instant message applications installed in their terminals. Each watcher can use the received status information for judging whether it is possible to make contact with the user (who permitted the information disclosure) through the instant message system or other methods of communication.

The "watchers" are a group of users of the instant message system that have been designated by a registered user (user who has registered with the instant message server) as the access right holders of his/her status information. A record of the user group (watchers) registered with the instant message server by the function of the instant message server is called "watcher list". Users registered with the watcher list can include not only the designated user group but also users living in a particular area, users who selected the same hobby category in menu registration of the instant message system, or all the users of the instant message system.

Meanwhile, a record of a frequently communicating user group (a group of users frequently communicating with a particular user) registered with the instant message server by the particular user for reference is called "buddy list". The user can classify the users on the buddy list into "private groups" according to hobby, area, level of closeness, etc. for convenience and register the private groups with the server. The user can use the buddy list and the private groups for designating the destinations in the instant message application and other applications for audio communication, video telecommunication, e-mail, etc. The instant message application has recently become capable of detecting usage statuses of communication devices of the users, registering the device usage status information with the server, and disclosing the device usage status information to other users of the system similarly to the disclosure of the user status information.

Other than such simple status information of the users, personal information such as full name and hobby, multimedia information such as facial portrait, voice, music and video can also be registered with the instant message server directly or as links. Examples of terminals in which the instant message application can be installed in personal computers, cellular phones, PDAs (Personal Digital Assistants), etc. The instant message applications installed in the terminals establish connection with the instant message server computer by use of communications networks having various bandwidths and communication characteristics, such as wireless LANs, wired LANs, wireless packet networks and ISDNs (Integrated Services Digital Networks).

The users of the system can make access to the instant message server not only from fixed terminals but also from mobile terminals equipped with the instant message application even when away from home, on the road, in transit, etc.

SUMMARY OF THE INVENTION

As the communication between individuals has become more and more popular, the function for managing the user status information, device usage status information, buddy lists and private groups, which used to be a function of the instant message server of the instant message system, is beginning to be supported as an independent service. In such circumstances, a system for managing the service and a server for providing the service are beginning to be called "presence system" and "presence server", and the information on the user status and device usage status of a user which is managed by the presence server and disclosed to other users when permitted by the user is called "presence information".

However, the usage of the presence information (also called "referred information") still has some room for improvement.

For example, a variety of information is being registered as the presence information as mentioned above, and the method for access to the presence server and the network environment have diversified. Therefore, when the presence information of a user is referred to by a plurality of terminals, presence information available to each terminal can vary depending on supported functions and performance of the terminal.

However, such difference of the supported functions of the terminals are not taken into consideration so far, and thus each terminal is required to receive all types of presence data from the server, select information of available types from the received presence data, and present the selected information to the user. The reception of unnecessary presence information leads to waste of communication resources, an excess processing load on the terminal, etc.

Further, in cases where a user has been registered with a plurality of private groups, if an instant message or e-mail is transmitted by designating the private groups containing the user as the destinations, a plurality of same messages (corresponding to the private groups) may be delivered to the user, causing inconvenience to the user, waste of communication resources, etc.

The present invention provides a technique for finely changing the method for processing messages depending on the presence information of the users.

For example, the present invention provides a technique for processing and restricting the presence information to be received by each terminal depending on the terminal's supported functions.

Specifically, there is provided a technique capable of reducing the amount of data to be processed by the terminal of the user (in which the application of the presence system has been installed) by reducing the amount of presence data (data of the presence information) delivered from the presence server to the terminal by letting the presence server filter the contents of the presence information to be delivered depending on communication measures and data type available to the terminal and discard part of the presence information.

The present invention also provides a technique capable of removing redundant user IDs and eliminating redundant delivery of two or more messages having the same contents to a user in cases where two or more same user IDs exist in private groups and user IDs designated as destination addresses.

In accordance with an aspect of the present invention, the presence server acquires terminal information which has been stored therein based on terminal information contained in a presence inquiry request message (presence information reference request) from a user and thereby learns the type of data that can be handled and processed by the terminal of the user. Subsequently, the presence server reconstructs the presence information of a referred user (requested by the message) into presence information that can be handled and processed by the terminal, and sends the reconstructed presence information to the presence system application of the terminal.

By the above process, the server of the presence system is allowed to transmit limited presence information that matches the functions and performance of the user terminal receiving the presence information, by which telecommunication data size and the processing load on the terminal (in which the presence system application has been installed) can be reduced.

In accordance with another aspect of the present invention, the presence server temporarily expands destination addresses designated by a user into addresses of individual users. When one or more private groups are included in the destinations, the presence server temporarily expands the destinations into addresses of individual users and checks whether or not there exists an address of an individual user redundantly included in the destination addresses. If there exists an address of an individual user redundantly included in the destination addresses, the presence server removes the redundant addresses of the individual user and transmits the message to the individual user using only one address.

By the above process, the server of the presence system is prevented from transmitting two or more same messages to a terminal (in which the presence system application has been installed), by which communication efficiency of the server increases. Further, each user is saved from receiving redundant messages with a terminal and thereby inconvenience to the user can be avoided.

By the present invention, proper and efficient use of the presence information can be realized without the need of wasting communication resources.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 8 is a flow chart showing a process for removing redundant addresses when private groups are used as destinations in the embodiment;

FIG. 9 is a table showing the composition of a watcher list employed in the presence system of the embodiment;

DETAILED DESCRIPTION OF THE EMBODIMENTS

Figure 1:
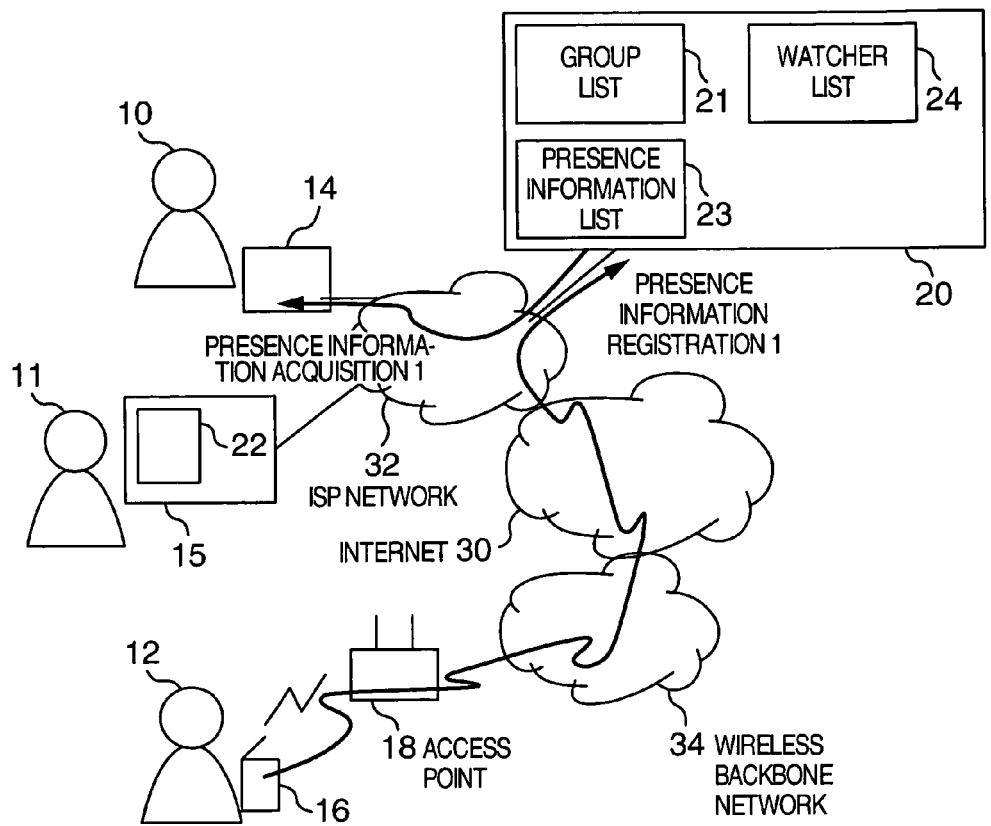
FIG. 1 is a block diagram showing the composition of a presence system in accordance with an embodiment of the present invention.

Referring now to the drawings, a description will be given in detail of a preferred embodiment in accordance with the present invention, wherein like reference characters designate like or corresponding parts throughout the views.

This embodiment relates to a method for supplying a user with presence information which is managed by a presence server 20 having the system configuration shown in FIG. 1, and a method for expanding a group address of a private group into addresses of individual users.

In the presence system shown in FIG. 1, the presence server 20, personal computer 14 and 15, and a wireless mobile terminal 16 are connected together by a network including the Internet 30, an ISP network 32, an access point 18, a wireless backbone network 34, etc.

An application program of the presence system has been installed in the personal computers 14 and 15 and the wireless mobile terminal 16. The application program is executed by the CPU (Central Processing Unit) of each device, by which the functions of the application program are implemented.

Presence information lists 23 and group lists 21 have previously been registered with the presence server 20 by the user 10 of the personal computer 14 and the user 12 of the wireless mobile terminal 16. It is assumed that the user 12 of the wireless mobile terminal 16 has already permitted the disclosure of his/her status information (presence information) to the user 10. Each watcher list 24 is generated by the presence server 20 in response to a request from a user. The watcher lists 24 are generated as service for the users of the presence system.

The "PRESENCE INFORMATION ACQUISITION 1" from the presence server 20 by the user 10 shown in FIG. 1 is carried out by the following process.

The user 10 previously registers a status information notification request (requesting the status information (presence information) of the user 12) with the presence server 20 via the ISP network 32 using his/her personal computer 14. Specifically, identification information (identity) of the user 10 is registered with the watcher list 24 associating with identity of the user 12 as a key.

The composition of the watcher list 24 will be described later referring to FIG. 9. Incidentally, a user who refers to the presence information of other users as in this explanation will hereinafter be referred to as "watcher". In this state, the user 12 registers the change of his/her status with the wireless mobile terminal 16. The wireless mobile terminal 16 registers "PRESENCE INFORMATION REGISTRATION 1" (indicating the presence information of the user 12) with the presence information list 23 of the presence server 20 via the access point 18, the wireless backbone network 34, the Internet 30 and the ISP network 32. The presence server 20 searches the watcher list 24 for the watchers of the status information (presence information) of the user 12 in response to the arrival of the "PRESENCE INFORMATION REGISTRATION 1" of the user 12 and the update of the presence information list 23 of the user 12. In the example of FIG. 9, the user 10 is found as the watcher, therefore, the presence server 20 transmits a presence information message (indicating the status of the user 12 has changed) to the personal computer 14 of the user 10 via the ISP network 32.

Next, the usage of a private group when a user 11 sends a message will be explained referring to the same FIG. 1.

The user 11 (with the personal computer 15) receives his/her group list 21 (listing a plurality of private groups of the user 11) and addresses of frequently referred individual users, etc. when the user 11 starts using the presence system.

The user 11 uses one or more of the private groups listed on a copy 22 of the group list 21 (received using the personal computer 15) as the destinations of the message he/she sends. The destinations will hereinafter be referred to as "destination(s) from the user 11".

On sending the message, the user 11 transmits the message itself and information on the private group(s) (selected from the copy 22 of the group list 21 of the user 11) from the personal computer 15 to the presence server 20 via the ISP network 32.

In response to the arrival of the message and the "destination(s) from the user 11", the presence server 20 transmits the message from the user 11 to all the "destination(s) from the user 11". On the transmission of the message, since the "destination(s) from the user 11" includes one or more private groups of the user 11, the presence server 20 expands the destination(s), that is, translates group addresses of the private group(s) of the "destination(s) from the user 11" into individual addresses of individual users contained in the private group(s).

The presence server 20 expands the destination(s) by searching the group list 21 of the user 11 (group list 21 registered with the presence server 20) for the corresponding private group(s) and acquiring all the destination addresses of the users of the presence system contained in the private group(s), and then transmits the message from the user 11 to all the destinations (destination addresses) acquired by the expansion of the "destination(s) from the user 11".

FIG. 9 is a table showing an example of the watcher list 24. The watcher list 24 of this example has a tabular form, in which a first column 240 indicates "referred users" (users whose presence information is referred to) and the latter columns 242 indicate the watchers. Since there can be a plurality of watchers, the latter columns 242 for a referred user includes as many columns as the watchers of the referred user. In each of the columns, information identifying the user of the presence system (generally, a user name) is registered.

If the user 10 sends a notification request for the status information (presence information) of the user 12 to the presence server 20, the presence server 20 registers the user 10 as a watcher with a sub field 252 of the field (latter columns) 242 of a line 250 of the user 12. While the user 10 in this example is registered at the front end (since there are no other users as watchers), if some watchers have already been registered, the user 10 is registered following the sub fields of the already registered watchers. Meanwhile, if the user 10 sends a notification cancellation request regarding the status information (presence information) of the user 12 to the presence server 20, the presence server 20 deletes the sub field 252 (indicating the user 10) from the field 242 of the line 250 of the user 12.

Figure 2:
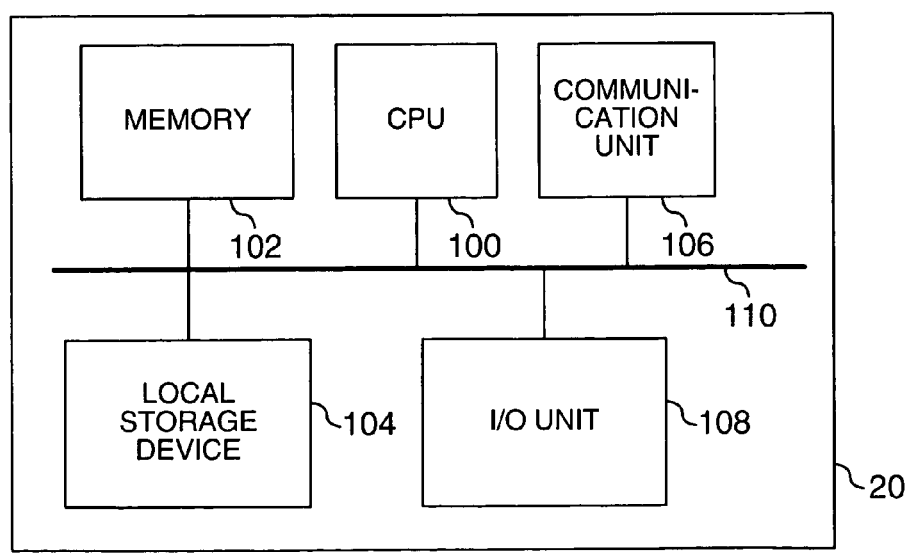
FIG. 2 is a block diagram showing an example of the composition of a presence server 20 employed for the embodiment.

FIG. 2 is a block diagram showing an example of the composition of the presence server 20. The presence server 20 is implemented by an information processing device including a CPU 100, memory 102, a local storage device 104, a communication unit 106 and an I/O unit 108 connected together by a common signal line 110. The functions of the presence server 20 described in this embodiment are realized by a program loaded on the memory 102 and executed by the CPU 100. The main body of the presence server program, addresses and presence information of the users of the presence system, and the group lists are stored in the local storage device 104.

The program may either be prestored in the local storage device 104 or introduced to the local storage device 104 via an available detachable record medium or a network (or a carrier wave propagating on the network) as needed.

The personal computers 14 and 15 and the wireless mobile terminal 16 also have composition similar to the composition explained above.

Although not shown in FIG. 2, the addresses, presence information and the group lists of the users of the presence system may also be stored in an external database which is connected to the presence server 20. In this case, the presence server program executed by the CPU 100 accesses not only the local storage device 104 but also the external database.

When the presence server program is executed, the communication unit 106 receives data which are transmitted from the presence system application (installed in the terminals of the users) via the communication network (Internet 30, etc.) while transmitting data (obtained by the execution of the presence server program on the CPU 100) to the users' terminals (operated by the presence system applications) via the communication network such as the Internet 30.

In the case where the database is external to the presence server 20 and the presence server program run on the CPU 100 utilizes the external database, the presence server 20 communicates data necessary for the operation of the service of the presence system (e.g. the addresses, presence information and the group lists of the users of the presence system) with the external database. The I/O unit 108 interfaces with a keyboard, a mouse, a display, etc.

Figure 3:
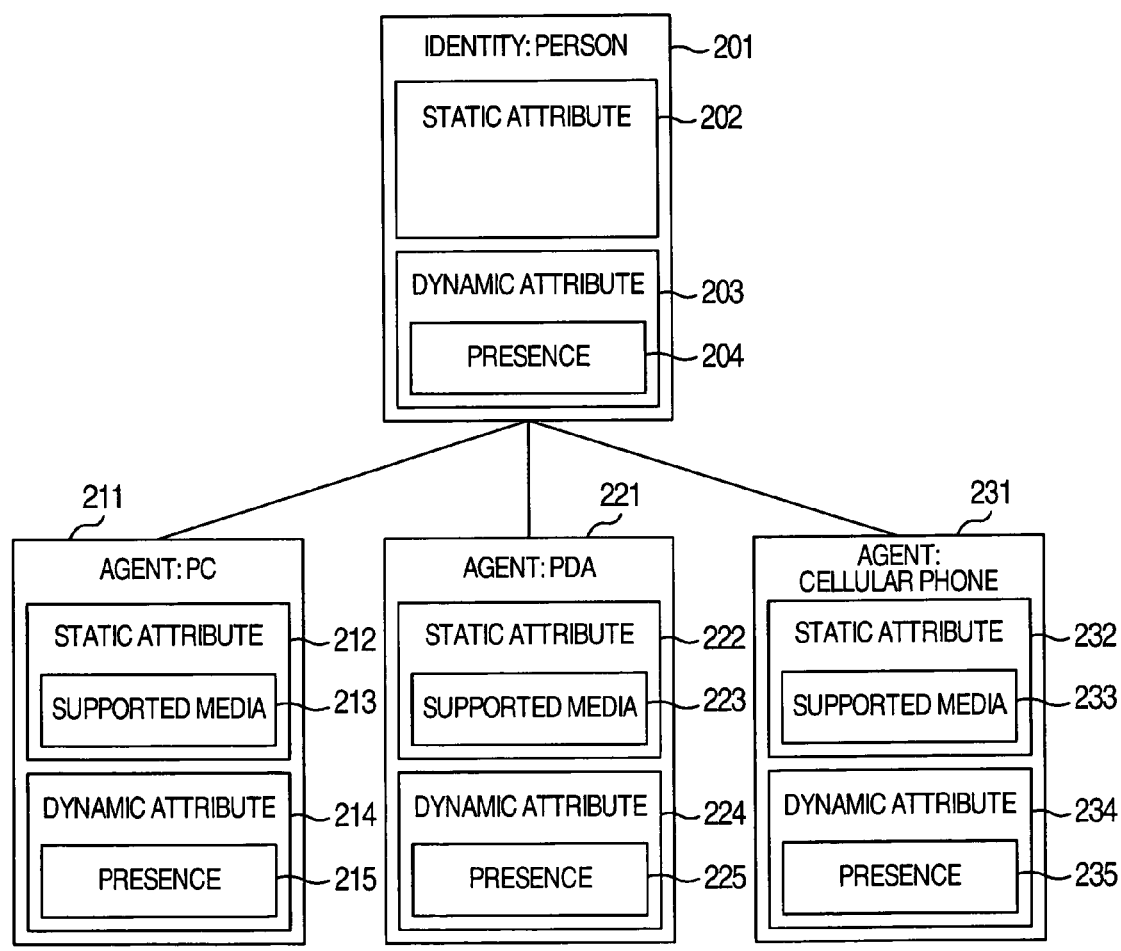
FIG. 3 is a block diagram showing an example of the composition of presence information which is employed in the presence system of the embodiment.

FIG. 3 is a block diagram showing an example of the composition of the presence information employed in the presence system which has been explained referring to FIG. 1. As mentioned above, the presence information is generated by the user's operation of the terminal and the registration with the presence server. The presence information of a user is composed of "Identity 201" corresponding to the user and "Agents (211, 221, 231)" as devices of the user in which the presence system application is installed.

In FIG. 3, Agent 211 of a personal computer, Agent 221 of a PDA and Agent 231 of a cellular phone are shown as examples of separate devices. In the real world, each Agent can be used by two or more users and the users can change. Therefore, the relationship between the Identity and Agents can change dynamically in the presence system, and they are associated with each other by dynamic links in order to define and indicate the relationship.

The Identity 201 is defined by static attributes 202 and dynamic attributes 203. The static attributes 202 indicate characteristics of the user that do not change much during the use of the presence system. Examples of the static attributes 202 include personal information (full name, date of birth, blood type, address, nickname, etc.), Identity name which is unique in the presence system, the group list and the buddy list.

The dynamic attributes 203, including the presence 204, indicate characteristics of the user that tend to change during the use of the presence system. Examples of the dynamic attributes 203 include statuses of the individual user like "on the job", "on a break" and "in transit". Examples of the presence 204 include information indicating methods for making contact with the user ("direct contact (telephone, etc.) OK", "e-mail OK", "contact not allowed", etc.) and information indicating the user's feelings ("busy", "dull", etc.).

Similarly to the Identity 201, each Agent (211, 221, 231) is also defined by static attributes and dynamic attributes. When the Agent 211 is a fixed (stationary) device such as a desktop personal computer, examples of the static attributes 212 include the IP address, the type and version number of the presence system application, the presence or absence of a GPS receiver for measuring the position, and supported media 213. The supported media 213 mean audio/voice input-output devices, picture/video/CG (Computer Graphic) input-output devices, etc. that are available to the presence system application and cooperative applications of the Agent 211.

Figures 10, 11:
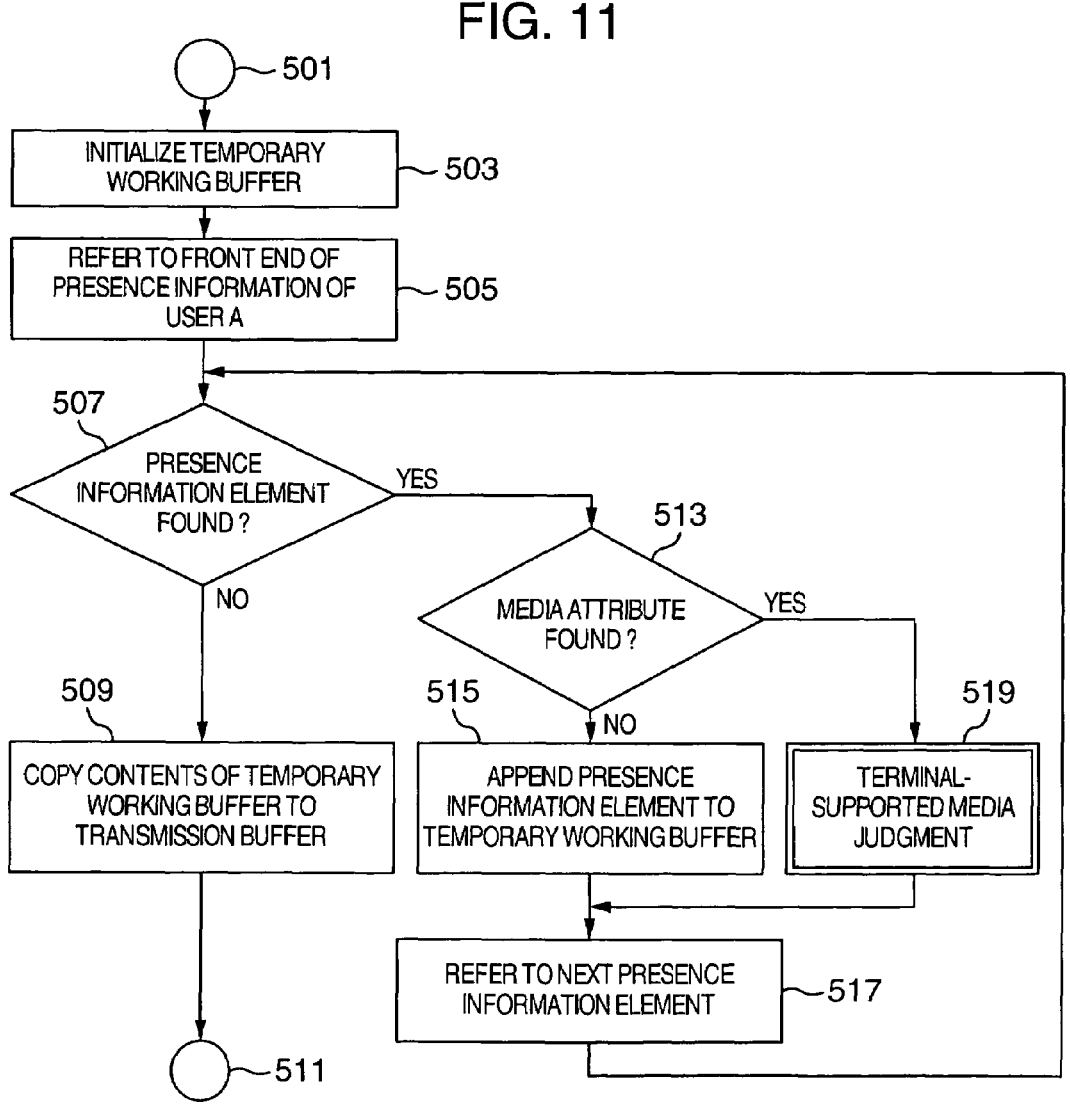
FIG. 10 is a table showing the contents of "supported media" in the presence information employed in the embodiment.
FIG. 11 is a flow chart showing the details of a media performance matching process 501 of the embodiment.

FIG. 10 shows a table 270 indicating the contents of the supported media 213. The table 270 is composed of two columns: a column 271 indicating a media attribute and a column 273 indicating a type of the media attribute. Lines 280 through 282 of the table show combinations of the media attributes and the types. For example, the line 280 shows the support of audio media (for speech) and its type.

Examples of the dynamic attributes 214 of the Agent 211 include whether the Agent 211 is in use or not and the presence 215 of the Agent 211. Examples of the presence 215 include usage status of the supported media 213. Although the contents of the Agents 221 and 231 are almost the same as those of the Agent 211, location information may be included in the dynamic attributes 234 since the device is a mobile terminal. The location information can be acquired by well known techniques. For example, the location information may be acquired by the Agent that is equipped with a GPS receiver or the current position of the Agent may be detected from wireless access point information.

Figure 4:
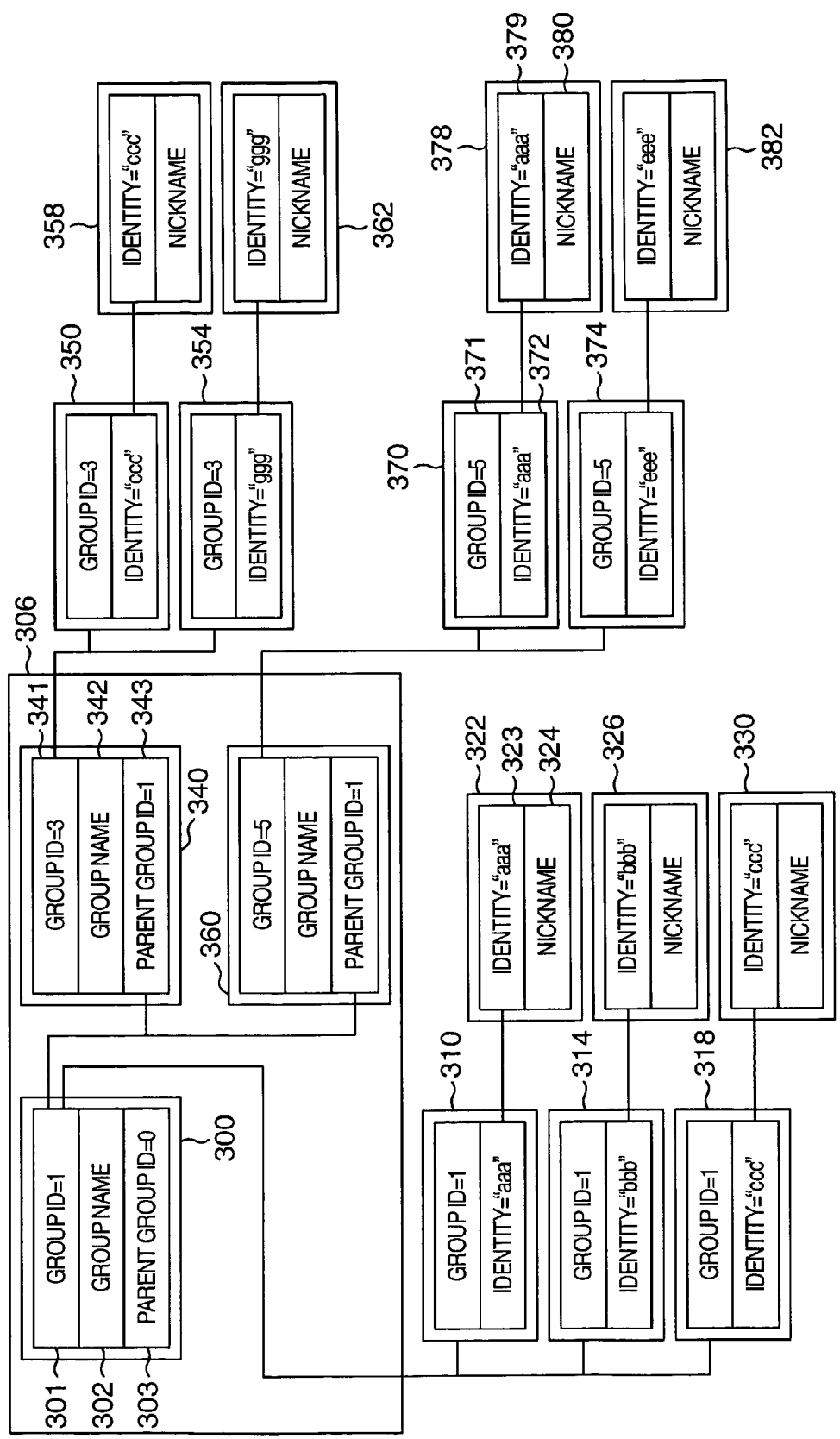
FIG. 4 is a block diagram showing an example of the composition of a group list of a user 11 employed in the presence system of the embodiment.

FIG. 4 is a block diagram showing an example of the composition of the group list of the user 11 in the presence system explained referring to FIG. 1. The group list 306 is managed by use of tree structure of the private groups. In this example, a private group 300 is placed at the top (root) of the tree structure, and private groups 340 and 360 are associated downwardly with the private group 300.

Each private group has a group ID that is unique in the presence system, a group name, and a parent group ID. The private group 340 has a group ID 341, a group name 342 and a parent group ID 343, for example.

The group ID 341 of the private group 340 is "3" which is unique in the presence system, and its parent group ID 343 is "1" denoting the private group 300. While the private groups 300 and 360 also have similar attributes, the private group 300 at the top (root) of the tree structure has a parent group ID 303 "0" indicating that it has no parent private group.

Next, an example of the composition of the private group 360 will be explained referring to FIG. 4. The private group 360 has group elements 370 and 374. Here, the group element 370 will be explained as an example.

The group element 370 includes a group ID 371 of a private group it belongs and an Identity name 372 indicating a user of the system. The Identity name 372 is associated with a user element 378. The user element 378 includes an Identity name 379 (that is the same as the Identity name 372) and a nickname 380 to be displayed by the presence system application.

Incidentally, the Identity names 372 and 379 are names that are used for the Identity name ("Identity") of the static attributes 202 which has been explained referring to FIG. 3. The presence server program searches for the group list and the presence information by use of the Identity name. The group element 374 has similar composition. The private groups 300 and 340 also have composition similar to that of the private group 360.

In the example of FIG. 4, the user indicated by the Identity name "aaa" is shown in two user elements 322 and 378. This means that the user indicated by the Identity name "aaa" belongs to both the private groups 300 and 360 of the user 11. Similarly, the user indicated by the Identity name "ccc" belongs to both the private groups 300 and 340 of the user 11.

Figure 5:
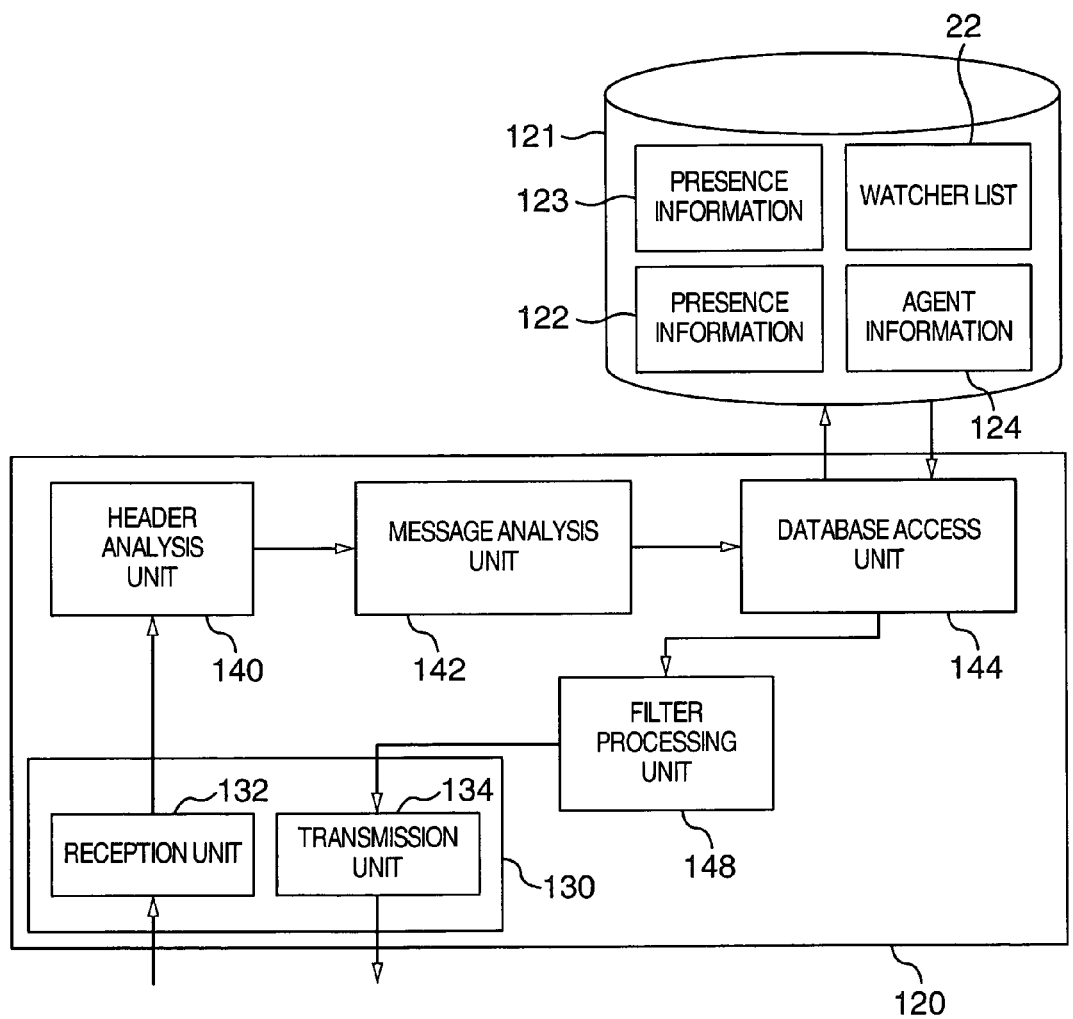
FIG. 5 is a functional block diagram explaining a filtering process which is conducted when presence information is referred to in the embodiment.

FIG. 5 is a functional block diagram explaining a filtering process which is conducted by the presence server 20 when the personal computer 14 of the user 10 refers to the presence of the user 12.

Referring to FIG. 5, a reception unit 132 receives a presence information update request message from outside. A transmission unit 134 transmits the presence information of users (after completing the filtering process) to outside. The two units are installed in a communication unit 130. A header analysis unit 140 analyzes the header of the presence information update request message supplied from the reception unit 132 and thereby checks the Identity name of the user (Identity name of the user 12 in this example), the type of the message, the type of the Agent (terminal) used by the user (the type for the wireless mobile terminal 16 in the presence system), consistency of the message, etc.

A message analysis unit 142 analyzes the body of the message after the header analysis by the header analysis unit 140 and thereby checks the presence information of the user requesting registration (the presence information of the user 12 in this example). A database access unit 144 makes access to a database 121 according to the result of analysis by the header analysis unit 140 and the message analysis unit 142 and thereby updates the presence information 122 of the user 12 (presence information list 23 shown in FIG. 1) while searching the watcher list 22 for the watcher (user referring to the presence information of the user 12). Subsequently, the database access unit 144 spots the watcher's agent from the presence information 123 of the watcher using the Identity name and Agent type of the watcher (obtained by the search) as keys, and thereby learns the supported media of the watcher's agent.

The supported media of each Agent can be judged from the specific Identity name and the Agent name of the Identity as explained referring to FIG. 3.

A filter processing unit 148 carries out the filtering process so as to select proper information (that can be handled by the functions of the Agent of each watcher) from the updated presence information of the user 12 based on information supplied from the database access unit 144. In this example, the user 10 is the only watcher.

Figure 6:
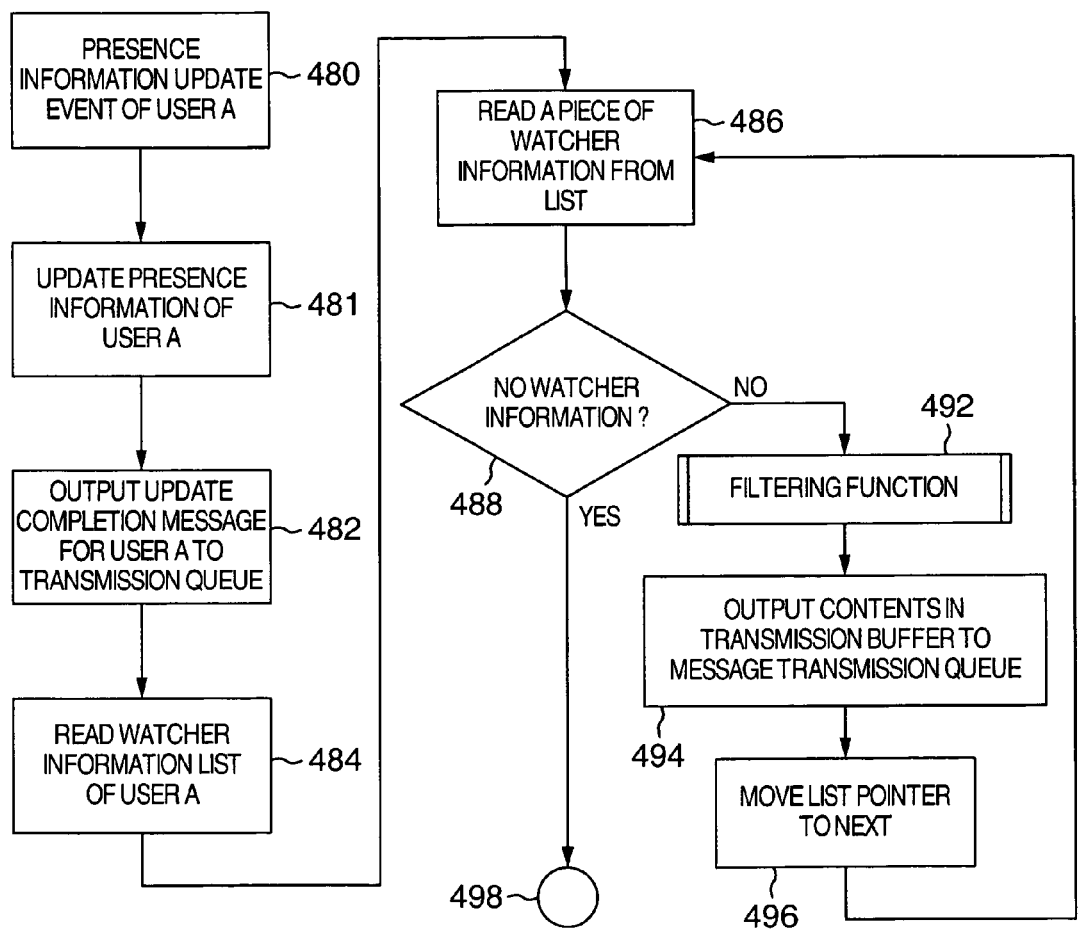
FIG. 6 is a flow chart showing a process conducted by a database access unit 144 of the embodiment.

FIG. 6 is a flow chart showing a process conducted by the database access unit 144 and the filter processing unit 148 of FIG. 5.

While the explanation of FIG. 5 was given using the particular name "user 12", in this explanation, the user of the presence system sending the presence information update request message will be generalized as "user A".

First, when a presence update event occurs (when the database access unit 144 receives the presence information update request message from the user A) (step 480), the presence server program updates the presence information of the user A stored in the database (step 481) and outputs a presence information update notification message to be sent to the terminal of the user A to a transmission queue (step 482).

Subsequently, a watcher information list of the user A is read out from the database using the Identity name of the user A as a key (step 484). Each piece of watcher information is successively extracted from the watcher information list (step 486) and whether the list is vacant or not is judged (step 488). If the list is vacant (488: YES), the process is finished (step 498). If there exists watcher information in the watcher information list (488: NO), the filtering process is executed by a filtering function (step 492) and the processed message is outputted to the transmission queue bound to the transmission unit 134 (step 494).

Thereafter, the pointer of the watcher information list is moved to the next (step 496) and the process is returned to the step 486 for extracting another piece of information from the watcher information list.

By the process, each of the watchers referring to the presence information of the user A can be notified of the update of the presence information of the user A, except when the presence information of the user A (to be transmitted to the watcher) is totally removed by the filtering function of the step 492.

Part of the presence information of the user A that is removed by the filtering function of the step 492 is presence information that can not be handled by the watcher's agent. The server program does not transmit the presence information that can not be processed by the Agent (terminal) of the watcher, by which the amount of data received and processed by the terminal can be reduced.

Figure 7:
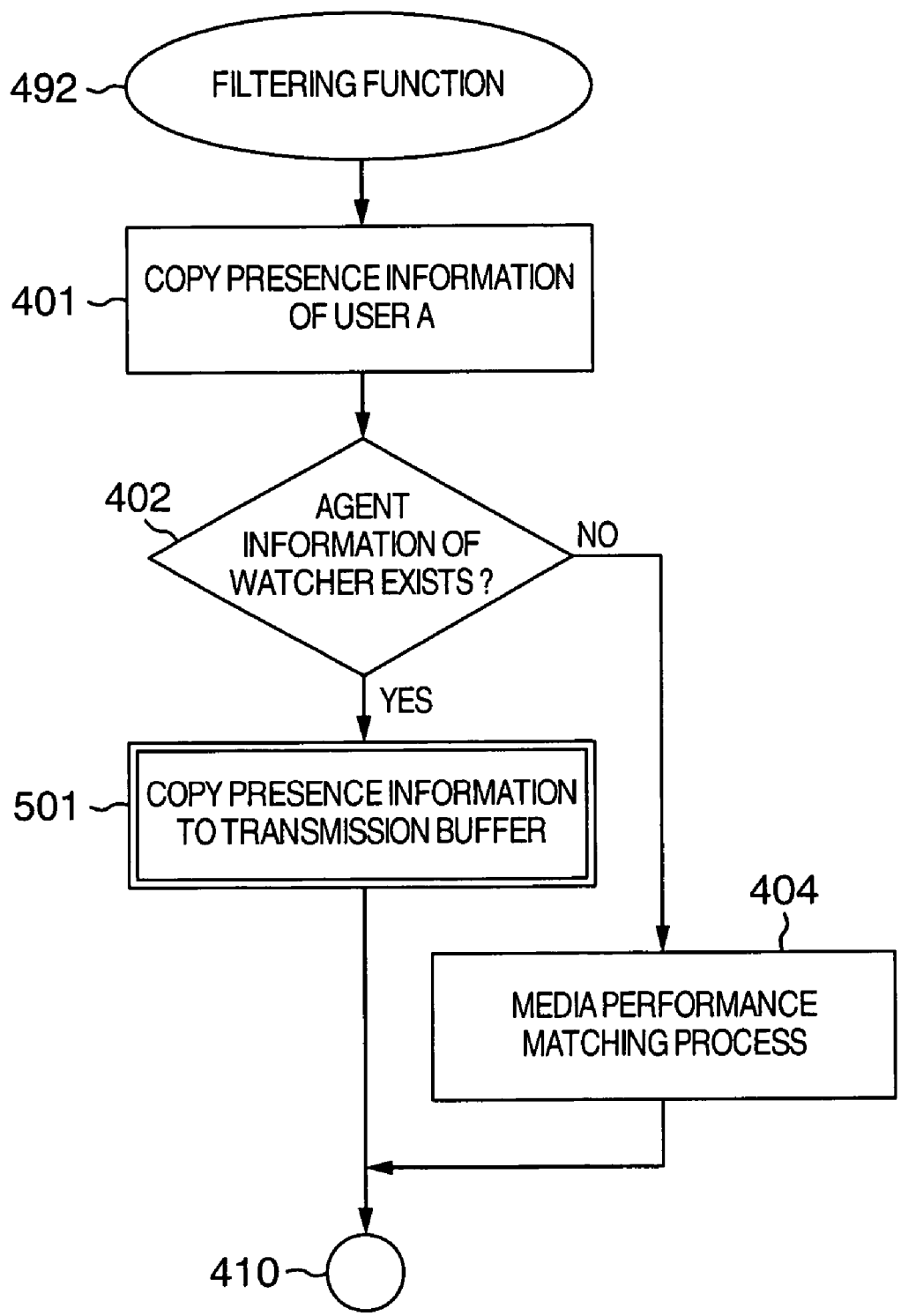
FIG. 7 is a flow chart showing the details of a filtering function 492 of the embodiment.

FIG. 7 is a flow chart showing the details of the filtering function 492 shown in FIG. 6.

In the filtering function 492, in order to send the presence information of the user A to the terminal of the watcher, the presence information of the user A is copied first (step 401) and whether there exists information on the watcher's agent is checked (step 402). If there exists no information, the presence information of the user A (as it is) is directly copied to the transmission buffer as presence information to be transmitted to the watcher (step 404) and the process is ended (step 410). If there exists information on the watcher's agent, a media performance matching process (step 501) is carried out and the process is ended (step 410). The media performance matching process will be explained below referring to FIG. 11.

FIG. 11 is a flow chart showing the details of the media performance matching process (step 501). First, in order to process (pick up) the presence information of the user A in a way matching the performance (functions) of the terminal of the watcher, a temporary working buffer (temporary work area) for storing the processed presence information is initialized (step 503).

Subsequently, in order to refer to the presence information of the user A having the list structure shown in FIG. 3, the top (front end) of the list is referred to (step 505). Whether there exists an element of the presence information (presence information element) in the referred part of the list is checked (step 507). If no presence information element is found (507: NO), it is judged that no more presence information element to be referred to exists or remains, and the contents of the temporary working buffer (storing the processed presence information are) are copied to the transmission buffer (step 509) and the process is ended (step 511).

If a presence information element of the user A is found in the step 507, whether the element has a media attribute or not is checked (step 513). The media attribute is the one which has been explained referring to the column 271 of FIG. 10. If no media attribute is found (513: NO), the presence information element is judged to be unrelated to the media. In this case, the presence information element is added to the contents of the temporary working buffer (step 515) and the process is returned to the step 507 while referring to the next presence information element (step 517).

If a media attribute is found (513: YES), a terminal-supported media judgment (for judging whether the media attribute is supported by the terminal of the watcher) is carried out (step 519). The details of the terminal-supported media judgment will be explained below referring to FIG. 12. Thereafter, the process is returned to the step 507 while referring to the next presence information element (step 517).

Figure 12:
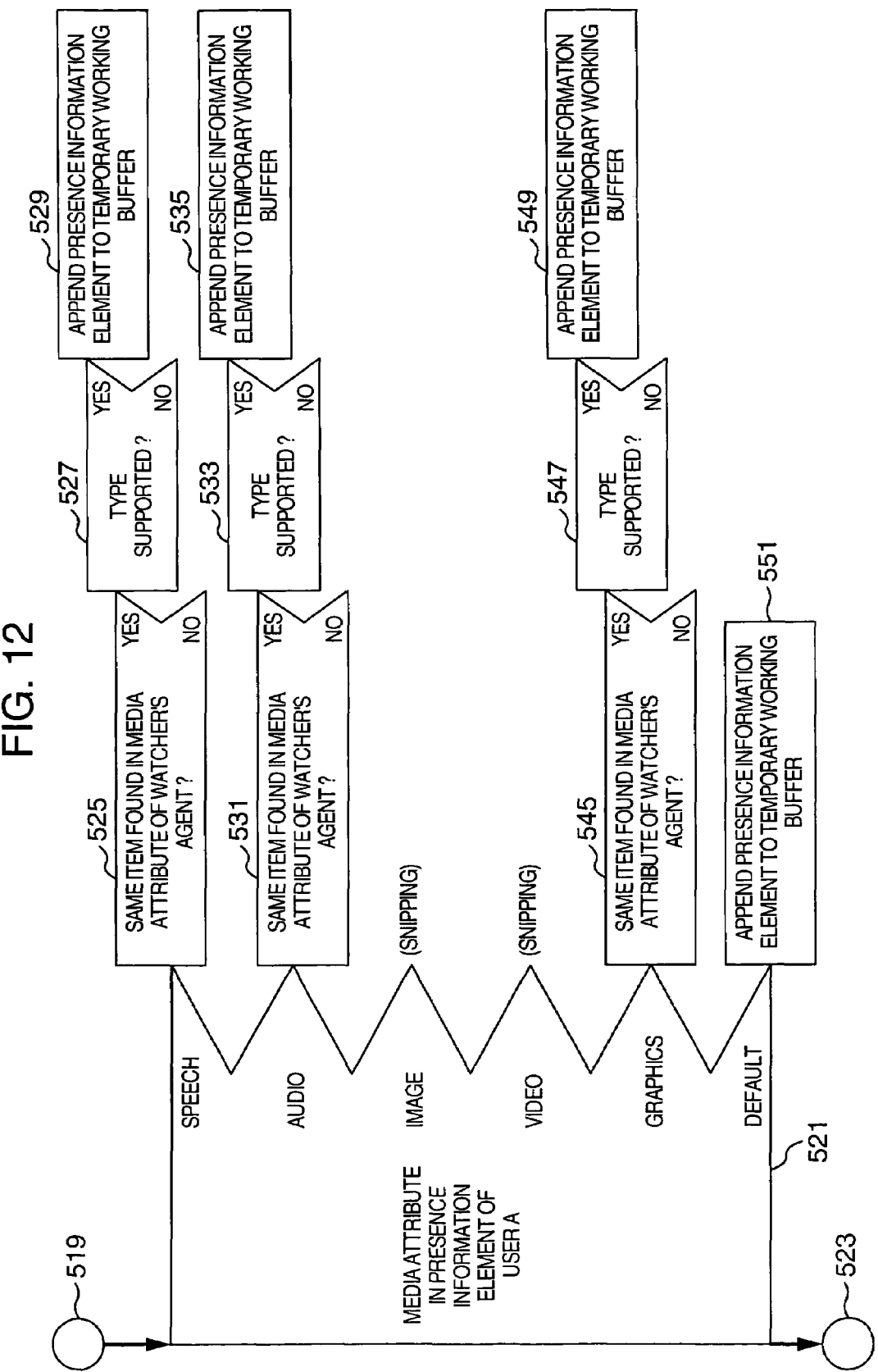
FIG. 12 is a flow chart showing the details of a terminal-supported media judgment process 519 of the embodiment.

FIG. 12 is a flow chart showing the details of the terminal-supported media judgment process (step 519) shown in FIG. 11. In the process 519, whether or not the media attribute contained in the presence information element of the user A is supported by the media attribute of the terminal of the watcher is judged.

Concretely, the media attribute in the presence information element of the user A is classified first (step 521). If the media attribute can not be classified under media attributes that are supported by the presence server, the media attribute is regarded as "default" (to be handed over as it is to the terminal). In this case, the presence information element is added to the contents of the temporary working buffer (step 551) and the process is ended (step 523).

If the media attribute in the presence information element of the user A is classified in the step 521 into "speech", the media attribute of the Agent in the presence information of the watcher is searched for to judge whether or not the same item ("speech") is found (step 525). If the same item is not found (525: NO), the process is ended (step 523).

If the same item is found in the media attribute of the watcher's agent (525: YES), whether the "type" of the media attribute is supported or not is judged (step 527). If the type is not supported (527: NO), the process is ended (step 523).

If the type of the media attribute is supported (527: YES), the presence information element is added to the contents of the temporary working buffer (step 529) and the process is ended (step 523).

Also for "audio", "image", "video" and "graphics" shown in the step 521 of FIG. 12, a process similar to the above process for "speech" is carried out.

By the processes explained above, the presence system is allowed to carry out the notification of presence information so as to match the functions and performance of the terminal of each watcher.

As described above, by letting the presence server 20 discard part of the contents of the presence information to be distributed to the watcher depending on the communication functions and data type available to the terminal of the user (watcher), the amount of presence data (data of the presence information) transmitted from the presence server 20 to the terminal can be reduced and thereby the amount of data to be processed by the terminal can be cut down.

In the following, a destination expansion process regarding private groups (translating group addresses of private groups into individual destination addresses), which is conducted when a message from the user 11 is transmitted and distributed by the presence server program (program of the presence server 20), will be explained referring to FIG. 8 and FIG. 4.

When the private groups 300 and 340 shown in FIG. 4 are designated by the user 11 as the destinations of the message, a user indicated by the Identity name "ccc" is redundantly designated as the destinations. The presence server program conducts the following process in order to avoid the redundant designation of destinations.

When a message distribution event for the user 11 occurs (step 460), each destination is read out from a destination address list one by one while checking whether or not it is the end of the list (step 462).

If it is not the end of the destination address list (462: NO), the presence server program judges whether or not the destination read from the list is a private group (private group address) of the user 11 (step 472). If the destination is a private group (472: YES), the presence server program expands the private group address into individual addresses (step 474) and stores the individual addresses in the temporary working buffer (step 476).

If the destination is not a private group of the user 11 (472: NO), the presence server program judges that the destination is an individual address, and stores the address (as it is) in the temporary working buffer (step 476).

Subsequently, the presence server program moves the reference pointer of the destination address list by one (step 478), returns to the step 462, and thereafter repeats the above process until the end of the destination address list. If the process has reached the end of the destination address list (462: YES), the presence server program executes the sorting of the individual addresses stored in the temporary working buffer (step 464), removes redundant individual addresses (step 466), outputs the message and the individual addresses stored in the temporary working buffer to the transmission queue (step 468), and ends the process (step 470).

By the above process, overlapping and redundant individual addresses can be removed when a user of the presence system designates his/her own private groups as the destinations of the message, by which redundant transmission of messages from the presence server 20 can be eliminated and thereby the traffic (telecommunication data size) in the presence system and the amount of data to be processed by the terminals of message receivers can be reduced considerably.

As described above, in cases where two or more same user IDs exist in the private groups and user IDs designated as the destination addresses, redundant user IDs can be removed and redundant delivery of two or more messages having the same contents to a user can be eliminated.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. A presence data management method implemented by a plurality of devices connected by a network and a presence server storing referred information on the users of the devices that the users agreed to disclose, comprising the steps of:
   receiving an information reference request from the device of a user requesting information reference;
   detecting information processing functions of the device of the user as an information reference requester;
   processing the referred information on a referred user requested by the information reference requester depending on the detected information processing functions; and
   sending the processed referred information to the device of the information reference requester.

2. The presence data management method according to claim 1, wherein the detecting step is executed in response to a change of the referred information on the referred user requested by the device of the information reference requester.

3. The presence data management method according to claim 1, wherein:
   the presence server stores information on the information processing functions as an attribute of the device of the user as the information reference requester, and
   the detecting step is executed by referring to the stored attribute.

4. The presence data management method according to claim 1, wherein:
   the referred information includes multiple types of information of different media attributes, and
   the referred information on the referred user to be sent to the device of the information reference requester is selected depending on the detected information processing functions in the processing step.

5. The presence data management method according to claim 4, wherein in the selecting step, the selection of the referred information is carried out by comparing media attributes supported by the device of the information reference requester obtained by checking the detected information processing functions with the media attributes of the stored referred information.

* * * * *